Jan. 19, 1932.                L. J. B. GLUZEK                1,842,323
                         MEDICAL DIAGNOSTIC DEVICE
                         Filed June 30, 1930        2 Sheets-Sheet 1
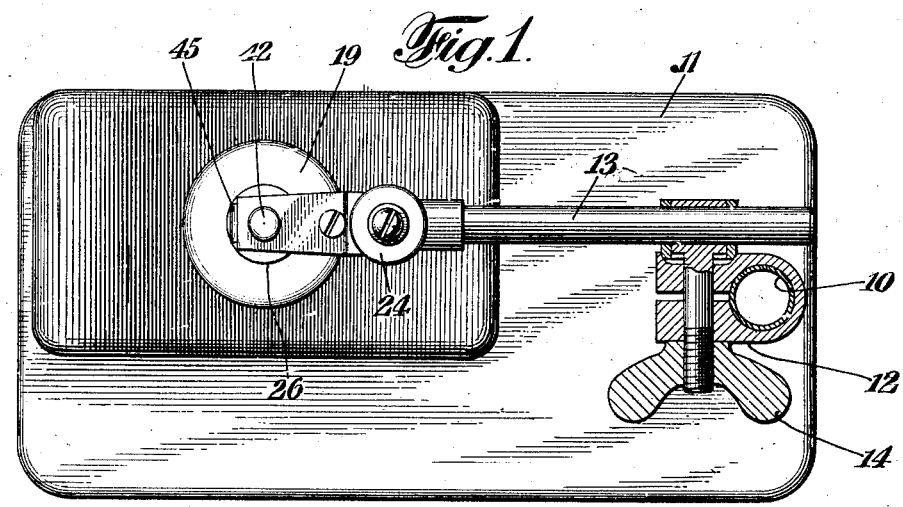
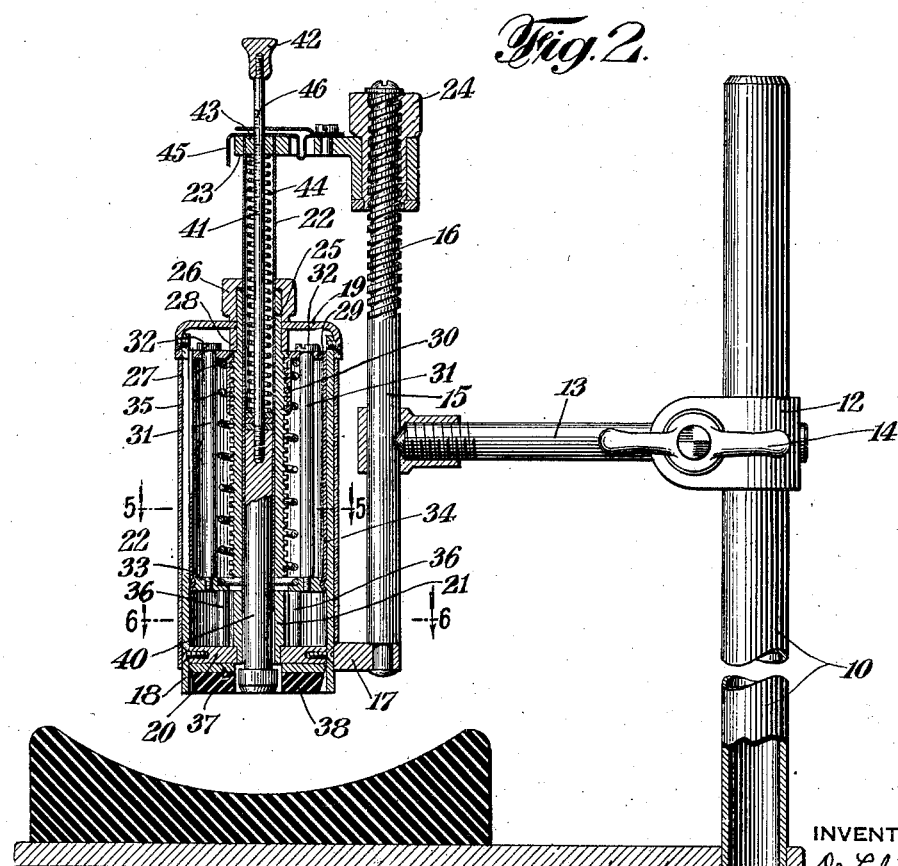
INVENTOR
Dr. L. J. B. Gluzek
BY
Kenyon & Kenyon
ATTORNEYS Jan. 19, 1932.  L. J. B. GLUZEK  1,842,323
MEDICAL DIAGNOSTIC DEVICE
Filed June 30, 1930   2 Sheets-Sheet 2
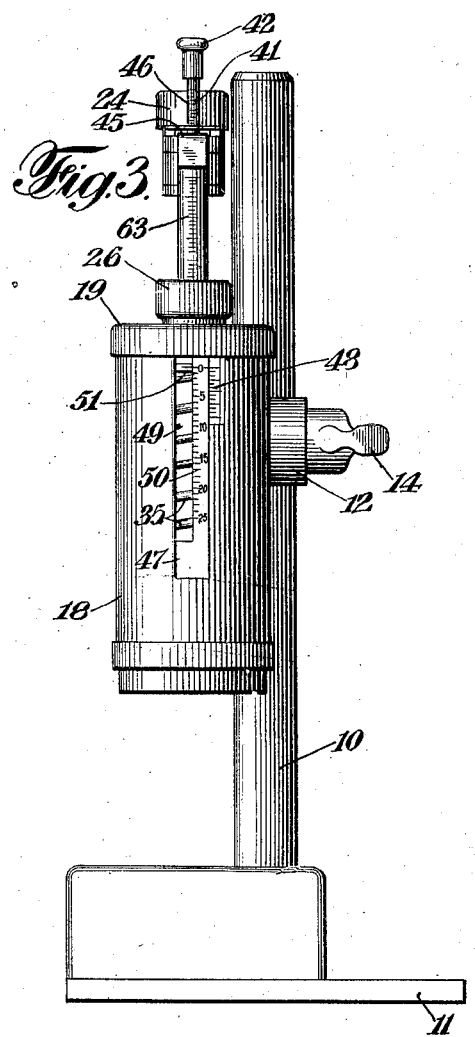
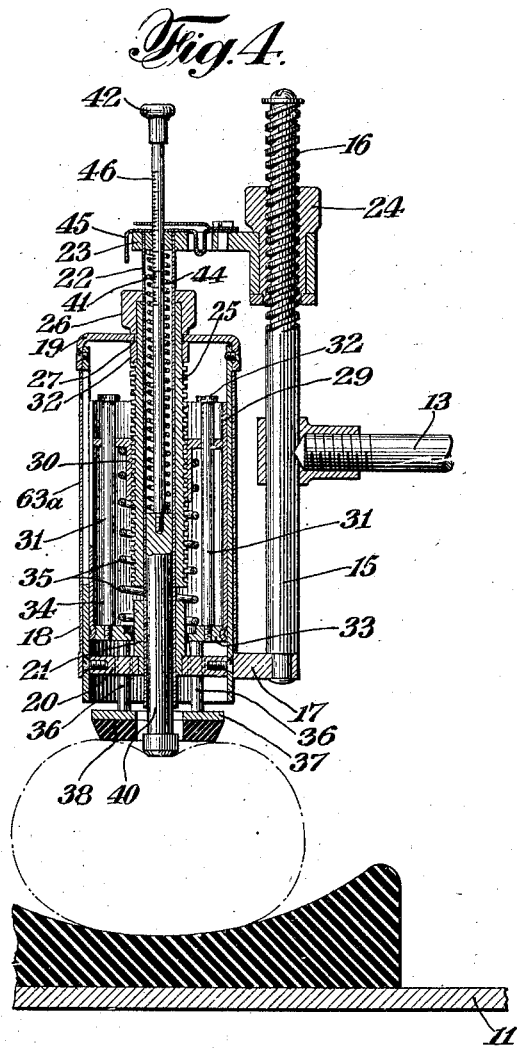
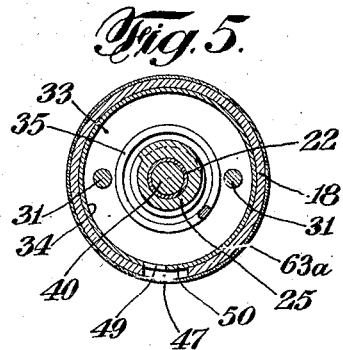
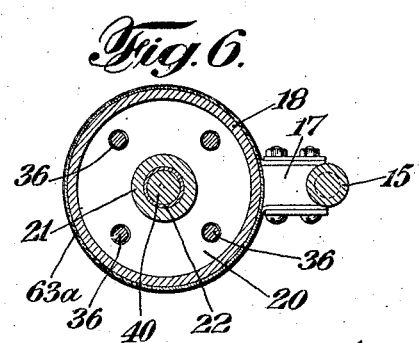
INVENTOR
Dr. L. J. B. Gluzek
BY
Kenyon & Kenyon
ATTORNEYS.

Patented Jan. 19, 1932

1,842,323

UNITED STATES PATENT OFFICE

LORAND J. B. GLUZEK, OF NEW YORK, N. Y., ASSIGNOR TO SENSAME LABORATORIES, INC., OF NEW YORK, N. Y., A CORPORATION OF NEW YORK

MEDICAL DIAGNOSTIC DEVICE

Application filed June 30, 1930. Serial No. 464,781.

This invention relates to medical diagnostic devices and has for its object an inexpensive, simple and efficient device adapted to serve as a standard meter of pain.

The device operates on the known principle that pain produced by the application of pressure to one part of the human body can be neutralized by the application of pressure to an adjacent part of the body in such a manner that the sensation of pain ceases. By means of this instrument, pressure is applied to a portion of the body of a person under examination and is increased until the person gives indication of experiencing pain, after which pressure is applied to an adjacent portion of the body until the person gives indication that the sensation of pain has ceased. Indications are taken of the pressures required and are compared with a predetermined standard from which deductions may be made. By means of this device, the sensitiveness of an individual to pain may be determined. Also, a comparison of the same individual's sensitiveness to pain under different circumstances may be made. The apparatus may also be used to compare the sensitiveness of different individuals and to measure pain experienced by an individual as well as to determine where such pain is caused by actual change in some part of the body or has a mental origin.

Another use of the device is to measure the effectiveness of analgesics (pain-killing drugs) in certain instances. Other uses of the device will suggest themselves to physicians and those skilled in medicine.

Other objects, novel features and advantages of this invention will be apparent from the following specification and accompanying drawings, wherein:

Fig. 1 is a plan view partially in section of an embodiment of the invention;

Fig. 2 is a section substantially on the line 2—2 of Fig. 1.

Fig. 3 is a side view.

Fig. 4 is a view similar to Fig. 2, but with the elements in different positions; and Figs. 5 and 6 are sections on the line 5—5 and 6—6 respectively of Fig. 2.

A post 10 is carried by a plate 11 and a clamping member 12 is supported by the post 10. The clamping member 12 also supports a horizontal rod 13 which is horizontally adjustable in the clamp which in turn is vertically adjustable on the post 10, a wing nut 14 being provided for tightening the clamp to hold the parts in any desired position of adjustment. A vertical rod 15 is supported by the horizontal rod 13 and is provided at its upper end with a screw thread 16. A bracket 17 is attached to the lower end of the rod 15 and supports a metal cylinder 18, provided with a cap 19 and containing an annular member 20 attached to the cylinder near its lower end.

A hollow post 21 is carried by the annular member 20 and serves as a guide for the lower end of a tube 22, the upper end of which is connected to a bracket 23 supported by a rotatable sleeve 24 having an interior screw thread engaging with the screw thread 16. A screw threaded sleeve 25 is rotatably mounted on the tube 22 and has one end projecting through the cap 19 and a knob 26 is fixed to such end of the sleeve. The sleeve is also provided with a shoulder 27 and a collar 28 is interposed between the shoulder 27 and the cap 19. Within the cylinder 18 is provided a plate 29 having an interiorly threaded hub 30, the threads of the hub 30 and the sleeve 25 being in mesh.

Rods 31 having heads 32 extend through the plate 29 and their lower ends are threaded into a plate 33. A second cylinder 34 has its outer wall in sliding contact with the inner wall of the cylinder 18 and its bottom edge surrounds and is fastened to the plate 33 and its upper end surrounds the plate 32. A spring 35 is interposed between the plates 32 and 33 and tends to press them away from each other. The plate 33 is provided with an aperture large enough to receive the post 21 and also is provided with pins 36 which extend through apertures in the annular member 20 and carry a disk 37 attached to their lower ends, this disk being provided with an annulus 38 of sponge rubber or the like.

A plunger 40 is slidably mounted in the tube 22 and is provided at its upper end with a rod 41 extending above the upper end of the tube and having a button 42. Between the upper end of the plunger 40 and a plug 43 provided in the upper end of the tube 22 there is arranged a spring 44. A spring clip 45 is provided holding the rod 41 in any position to which it may be moved. On the rod 41 is provided a scale 46. A vertical slot 47 is cut in the cylinder 18 and a scale 48 is provided on the said cylinder adjacent the edge of this slot. The inner cylinder 34 is provided with a registering slot 49 and a scale 50 is provided on the inner cylinder adjacent one edge of the slot. The plate 29 is equipped with an indicating mark 51. The tube 22 is provided on its exterior surface with a scale 63. The cylinder 18 may be provided with an enclosing cylinder 63ª of celluloid or other transparent material, if desired.

In the use of this device a person's leg, for example, is laid on the base 10 in the holder 10ª and the cylinder 18 is adjusted through the medium of the clamp 12 until its lower end is in close proximity to the leg. The sleeve 24 is then rotated to move the tube 22 and plunger 40 downwardly. After the lower end of the plunger 40 engages the arm it moves no further but the tube 22 moves downwardly, depressing the spring 44. The downward movement of the tube 22 is continued until the person under examination indicates that pain is being experienced after which such movement is discontinued. The button 26 is then rotated to move the plate 29 downwardly in the cylinder 18 and the plate 33 and inner cylinder 34 are correspondingly moved downwardly by reason of the spring 35. The sponge rubber ring 37 is thus brought into contact with the person's leg. Rotation of the button 36 and downward movement of the plate 29 and compression of the spring 35 is continued until the person indicates that the force applied by the ring has neutralized the pain produced by the plunger 40. The extent of downward movement of the plunger 40 and the ring 37 may be read from the scales 63 and 48 respectively, and the forces applied by these members through their respective springs may be read from the scales 46 and 50 respectively which are so calibrated as to give direct reading of the forces applied. The various readings may be compared to predetermined scales and deductions made in accordance therewith. Also comparisons may be made between different readings obtained under different circumstances and with different individuals. While it is preferable to make measurements of pain sensation with this device by applying pressure to a person's leg, the device may also be used in the measurement of pain sensation by applying pressure to a person's arm.

It is of course apparent that this device may be put to several different uses and that modifications may be made in the structure without in any way departing from the spirit of the invention as defined in the appended claims.

I claim:

1. A diagnostic device of the character described comprising means for causing pain by applying pressure to a selected portion of the human body, means for applying a neutralizing force to an adjacent portion of the body, and means for measuring the neutralizing force.

2. A diagnostic device of the character described comprising means for forcing a member of small cross section into contact with a selected portion of the human body, means for forcing a member of larger cross section into contact with an adjacent portion of the human body, and means for measuring the force applied by said second member.

3. A diagnostic device of the character described comprising means for forcing a stiff member of small cross-section into contact with a selected portion of the human body, means for pressing a member of larger cross section having a slightly yieldable contact surface in engagement with an adjacent portion of the body, and means for measuring the force applied by said second member.

4. A diagnostic device of the character described comprising means for causing pain by applying pressure to a selected portion of the human body, means for applying a neutralizing force to an adjacent portion of the body, and means for measuring both of said forces.

5. A diagnostic device of the character described comprising a support, a pair of reciprocally mounted plungers adapted to engage selected portions of the human body, followers for said plungers reciprocally mounted on said support, springs interposed between said followers and said plungers, and means for determining the forces applied to said plungers by said resilient means upon movement of said followers relative to said plungers.

6. A diagnostic device of the character described, comprising a plunger of small cross-section, an annular plunger surrounding said first plunger, resilient means for exerting force on each of said plungers, and means for determining the force exerted by said resilient means on each of said plungers.

7. A diagnostic device of the character described comprising a circular plunger having a central opening, a second plunger arranged within said opening, a pair of movable members, resilient members interposed respectively between said movable members and said plungers, means for effecting movement of said movable members, and means for determining the force exerted by said resilient means on said plungers when the latter are held against movement while the movable members are advanced.

8. A diagnostic device of the character described comprising a plunger having a central opening, a second plunger arranged in said opening, a pair of movable members, springs interposed between said movable members and said plungers, and means for determining the force exerted by said springs upon relative movement of said movable members and said plungers.

9. A diagnostic device of the character described comprising a plunger having a central opening, a second plunger arranged in said opening, a pair of reciprocable members, springs interposed respectively between said reciprocable members and said plungers, and means for measuring the force exerted by said springs upon movement of said reciprocable members toward said plungers.

10. A diagnostic device of the character described comprising a pair of reciprocable plungers, a pair of reciprocable members in alignment with said plungers, springs interposed respectively between said reciprocable members and said plungers, and means for measuring the force exerted by said resilient means upon advancement of said members toward said plungers.

11. A diagnostic device of the character described comprising a pair of plungers, a pair of movable members, springs interposed between said movable members and said plungers, means for actuating said movable members to force said plungers into contact with a selected portion of the human body, and means for measuring the force exerted by said springs upon said plungers.

12. A diagnostic device of the character described comprising a hollow plunger, a second plunger arranged within said first plunger, a pair of movable members, springs interposed between said members and said plungers, means for actuating said movable members to force said plungers into contact with selected portions of the human body, and means for measuring the force exerted by said springs on said plungers.

13. A diagnostic device of the character described comprising a plunger of small cross section, an annular member surrounding said plunger and being of greater area than said plunger, means for sequentially forcing said plunger and annular member into contact with adjacent portions of the human body, and means for measuring the force applied to said second member.

14. A diagnostic device of the character described comprising a stiff member having a contact surface of small area, an annular member surrounding said first member and having a slightly yieldable contact surface of larger area than said first member, means for sequentially forcing said members into engagement with adjacent portions of the human body, and means for measuring the force applied by said second member.

In testimony whereof, I have signed my name to this specification.

Dr. LORAND J. B. GLUZEK.